(12) United States Patent
Poth

(10) Patent No.: US 12,130,208 B2
(45) Date of Patent: Oct. 29, 2024

(54) RADIAL PRESS AND METHOD FOR PRODUCING A HIGH-PRESSURE HYDRAULIC LINE

(71) Applicant: Uniflex-Hydraulik GmbH, Karben (DE)

(72) Inventor: Hubert Poth, Friedberg (DE)

(73) Assignee: UNIFLEX-HYDRAULIK GMBH, Karben (DE)

( * ) Notice: Subject to any disclaimer, the term of this patent is extended or adjusted under 35 U.S.C. 154(b) by 160 days.

(21) Appl. No.: 17/877,100

(22) Filed: Jul. 29, 2022

(65) Prior Publication Data

US 2022/0364949 A1 Nov. 17, 2022

Related U.S. Application Data

(63) Continuation of application No. PCT/EP2021/052489, filed on Feb. 3, 2021.

(30) Foreign Application Priority Data

Feb. 4, 2020 (DE) .................... 10 2020 102 724.9

(51) Int. Cl.
*G01M 3/40* (2006.01)
*B30B 7/04* (2006.01)

(52) U.S. Cl.
CPC .................. *G01M 3/40* (2013.01); *B30B 7/04* (2013.01); *F16L 2201/10* (2013.01)

(58) Field of Classification Search
CPC .......... G01R 27/2611; G01R 31/50–71; G01R 31/302; H02M 1/0009; H02M 1/08; H02M 3/1584; H02M 3/156
See application file for complete search history.

(56) References Cited

U.S. PATENT DOCUMENTS 3,725,167 A * 4/1973 Hunt ...................... B29C 55/24
156/149
4,306,442 A 12/1981 Schroeck
(Continued)

FOREIGN PATENT DOCUMENTS

DE 28 14 064 A1 6/1979
DE 28 44 475 A1 12/1981
(Continued)

OTHER PUBLICATIONS

International Search Report issued for International Patent Application No. PCT/EP2021/052489, mailed on May 11, 2021.

*Primary Examiner* — Lee E Rodak
*Assistant Examiner* — Demetrius R Pretlow
(74) *Attorney, Agent, or Firm* — Myers Wolin, LLC

(57) ABSTRACT

When producing a high-pressure hydraulic line, a connection fitting is attached to a multi-layer high-pressure hose having a reinforcing layer. A portion of a reinforced high-pressure hose and a connection fitting to be joined to it are provided. The connection fitting is placed onto the end portion of the high-pressure hose and a joining operation is carried out to form a sealed connection. The quality of the connection is determined by applying an electrical test signal to at least one connection of a testing arrangement having two connections. A first connection is electrically and/or magnetically coupled to the connection fitting and a second connection is contactlessly electrically and/or magnetically coupled to a reinforcing layer of the high-pressure hose. An electrical response signal is detected and the response signal is compared with a setpoint-value range stored in a memory of the testing arrangement.

14 Claims, 2 Drawing Sheets

(56) References Cited

U.S. PATENT DOCUMENTS

| | | | | |
|---|---|---|---|---|
| 4,498,691 | A * | 2/1985 | Cooke | F16L 33/2076 285/12 |
| 5,202,812 | A * | 4/1993 | Shinoda | G01R 31/52 361/93.6 |
| 5,898,105 | A * | 4/1999 | Owens | G01M 3/2846 73/40 |
| 5,969,618 | A | 10/1999 | Redmond | |
| 6,429,661 | B1 * | 8/2002 | Schweitzer, Jr. | G01R 31/60 324/529 |
| 9,879,806 | B2 * | 1/2018 | Scherer | F16L 33/2076 |
| 2002/0007658 | A1 * | 1/2002 | Amherd | B25B 27/10 72/453.16 |
| 2011/0221429 | A1 * | 9/2011 | Tamura | G01R 15/207 324/244 |
| 2012/0007356 | A1 * | 1/2012 | Menor | F16L 33/01 29/505 |
| 2012/0081110 | A1 * | 4/2012 | Racz | G01R 15/202 324/252 |
| 2013/0239380 | A1 * | 9/2013 | Wassenhoven | B25F 5/02 29/237 |
| 2014/0000742 | A1 * | 1/2014 | Betsinger | G01N 27/20 138/36 |
| 2014/0076449 | A1 * | 3/2014 | Betsinger | G01M 5/0033 138/104 |
| 2015/0177172 | A1 * | 6/2015 | Upasani | F16L 11/086 324/693 |
| 2018/0017597 | A1 * | 1/2018 | Hebiguchi | G01R 19/0084 |
| 2018/0133781 | A1 * | 5/2018 | Bertazzoni | B21D 39/048 |
| 2019/0128293 | A1 * | 5/2019 | Maro | G01M 3/2853 |
| 2019/0250202 | A1 * | 8/2019 | Shirakawa | H01B 13/067 |
| 2019/0346502 | A1 * | 11/2019 | Steuer | G01R 1/22 |
| 2019/0352488 | A1 * | 11/2019 | Iizuka | C08L 9/06 |
| 2020/0072396 | A1 * | 3/2020 | Schoenau | B29C 63/10 |
| 2022/0244295 | A1 * | 8/2022 | Takenaka | G01B 7/023 |
| 2022/0349958 | A1 * | 11/2022 | Chien | G01R 1/0416 |
| 2023/0107427 | A1 * | 4/2023 | Nakai | B29C 70/22 138/125 |

FOREIGN PATENT DOCUMENTS

| | | |
|---|---|---|
| DE | 39 05 856 C1 | 5/1990 |
| DE | 20109212 U1 | 9/2002 |
| DE | 202016100660 U1 | 2/2016 |
| EP | 1 935 525 A1 | 6/2008 |
| EP | 3 884 254 B1 | 4/2022 |
| GB | 2 179 751 A | 3/1987 |
| WO | 2012/088251 A1 | 6/2012 |

* cited by examiner

RADIAL PRESS AND METHOD FOR PRODUCING A HIGH-PRESSURE HYDRAULIC LINE

CROSS REFERENCE TO RELATED APPLICATIONS

This application is a continuation under 35 U.S.C. § 120 of International Application PCT/EP2021/052489, filed Feb. 3, 2021, which claims priority to German Application No. 10 2020 102 724.9, filed Feb. 4, 2020, the contents of each of which are incorporated by reference herein.

FIELD OF THE INVENTION

The present invention relates to a method for producing a high-pressure hydraulic line. In greater detail, the present invention relates to a method for producing a high-pressure hydraulic line by attaching a connecting fitting at the end of a multi-layer, high-pressure hose having at least one reinforcing layer, comprising the following steps:

Providing a portion of a reinforced high-pressure hose as well as a connecting fitting to be joined with this, placing the connecting fitting on the end portion of the high-pressure hose and performing a joining operation to form a tight connection of the high-pressure hose with the connecting fitting. Furthermore, the present invention relates to a radial press suitable for executing such a production method.

BACKGROUND

High-pressure hydraulic lines are produced on a large scale in the foregoing way, wherein one connecting fitting each is typically joined with both ends of the hose portion. A very widely used possibility of joining the (respective) connecting fitting with the hose portion at the end (in question) consists in radial pressing of a pressing sleeve of the connecting fitting in question in such a way that the hose—which is usually peeled beforehand on the outside and/or inside—is squeezed securely, durably and media-tightly in the annular gap that exists between the pressing sleeve (surrounding the hose on the outside) and a nipple (pressed into the inside of the hose). This is as much prior art as radial presses suitable for this purpose (see, for example, DE 28 44 475 A1).

The quality of the connection between the connecting fitting and the hose portion is extremely important from the viewpoints of occupational and industrial safety. This is so because, if the hose portion were torn out of the connecting fitting during high-pressure operation, it would represent an entirely considerable risk for the health and bodily integrity of persons present in the vicinity, not to mention property damage and environmental damage caused by released hydraulic fluid.

Against this background, the embodiments of the present disclosure have set an objective of contributing to increased safety during the high-pressure operation of high-pressure hydraulic lines produced as explained in the introduction.

SUMMARY

This objective is achieved according to embodiments of the invention by a determination of the quality of the connection of the connecting fitting with the high-pressure hose, comprising applying an electrical test signal to at least one terminal of a test arrangement having two terminals, of which a first terminal is coupled electrically and/or magnetically to the connecting fitting and a second terminal is coupled electrically and/or magnetically in contactless relationship to the reinforcing layer or at least one of the reinforcing layers of the high-pressure hose, recording an electrical response signal occurring in the test arrangement, comparing the response signal with a target-value range saved in a memory of the test arrangement for the high-pressure-hose/connecting-fitting pair in question.

The present disclosure makes use of several known facts. In the first place, it uses the knowledge that a relationship exists between the quality of the connection of the high-pressure hose portion with the connecting fitting, i.e. the safety against tearing out of the high-pressure hose from the connecting fitting or against a comparable failure, and the properties of the contact between the reinforcing layer (or at least one of the reinforcing layers) of the high-pressure hose on the one hand and the connecting fitting on the other hand.

Furthermore, it uses the knowledge that precisely those properties of the contact between the reinforcing layer of the high-pressure hose and the connecting fitting are reflected in the electrical response signal that occurs in a test arrangement having two terminals, with which arrangement an electrical test signal is applied to the region in question of the high-pressure hydraulic line, wherein a first terminal of the test arrangement is coupled electrically and/or magnetically to the connecting fitting and a second terminal of the test arrangement is coupled electrically and/or magnetically in contactless relationship to the reinforcing layer (or at least one of the reinforcing layers) of the high-pressure hose. This second terminal of the test arrangement is coupled in contactless relationship to the reinforcing layer (or at least one of the reinforcing layers), so that the integrity of the further layers of the high-pressure hose surrounding the reinforcing layer(s) in question on the outside and/or inside is not impaired and the high-pressure hose therefore remains completely intact. The response signal is compared in the test arrangement with a target-value range, which—as an individual target-value range valid for the specific high-pressure-hose/connecting-fitting pair in question—is saved in a memory of the test arrangement. Depending on whether the response signal lies within the limits of the target-value range or else outside of this, the end portion of the high-pressure hydraulic line being subjected to the test is classified as good or else inadequate with respect to the quality of the connection of the connecting fitting in question with the high-pressure hose portion.

This electrical test signal may be advantageously chosen, for example by being designed to oscillate over various frequency levels, in such a way that the reluctance and/or the impedance and/or the electrical resistance of the portion to be tested, situated between the two terminals, of the high-pressure hydraulic line can be inferred via the recorded electrical response signal. In this situation, the degree or the area of contacting between the connecting fitting and the at least one reinforcing layer plays a role, which—in many conventional connecting fittings—is in turn dependent in particular on the depth of penetration of the profiling of the pressing sleeve into the or at least one reinforcing layer.

Other production defects, which influence the electrical response signal stimulated by the electrical test signal, can also be detected. These include in particular a smaller than intended depth of insertion of the high-pressure hose into the connecting fitting, so that only part of the profiling of the pressing sleeve is in contact with the or one reinforcing layer. However, even an out-of-specification (e.g. too short)

peeling of the high-pressure hose in order to remove outer and/or inner material from the region of the subsequent connection with the connecting fitting can be detected by use of implementations of the inventive method, as can likewise an incorrect pressing dimension, an incorrect high-pressure-hose/connecting fitting combination (e.g. with respect to the material pairing) and an unsatisfactory condition of the reinforcing layer (e.g. due to corrosion or damage). Due to the fact that various individual production defects can result in different characteristic deviations of the response signal from the response signal that occurs in a properly produced high-pressure hydraulic line, it is possible not only to determine—by a correspondingly more detailed evaluation of the response signal—whether the respective high-pressure hydraulic line being tested with respect to the quality of the connection of the connecting fitting with the hydraulic hose meets the standard, but possibly to infer even the nature of the production defect from a possible deviation. Insofar, it is to be remarked that it is also entirely possible, within the scope of the invention, to evaluate several response signals, for example such as also the perturbation of a magnetic field by the workpiece to which the test signal is applied.

As a precaution, it is to be pointed out that, with respect to its applicability, the invention is in no way restricted to methods used for producing a high-pressure hydraulic line using connecting fittings having pressing sleeves that can be plastically molded by radial pressing. Other connecting fittings, especially so-called "reusable fittings", can also be used within the scope of the present invention. Furthermore, it is to be pointed out that the statement that the test arrangement has two terminals is not to be understood as restrictive in the sense of exactly two terminals. For example, the test arrangement may have more than two—e.g. three—terminals, and indeed especially when the invention is used in a method for producing a branched high-pressure hydraulic line.

A first preferred further development of the present invention is characterized in that, for electrical coupling of the first terminal of the test arrangement to the connecting fitting, a contact sensor is placed on the connecting fitting to form a galvanic contact between the contact sensor and the connecting fitting. Hereby particularly high reproducibility is achieved with a simple procedure.

Likewise with a view to high reproducibility, it is advantageous when, according to another preferred further development of the invention, the contactless electrical or magnetic coupling of the second terminal of the test arrangement to the at least one reinforcing layer is situated adjacent to the connecting fitting, i.e. not further away from it than 3 times the diameter of the high-pressure hose. It is particularly favorable when the contactless electrical or magnetic coupling of the second terminal of the test arrangement to the at least one reinforcing layer is situated in the immediate vicinity of the connecting fitting.

For the contactless electrical or magnetic coupling of the second terminal of the test arrangement to the at least one reinforcing layer, two procedures have proved particularly effective, namely on the hand capacitive and on the other hand inductive coupling. Which of these possibilities is to be given priority in the individual case depends in particular on the individual design of the high-pressure hose, namely the nature of the at least one reinforcing layer as well as of the other layers. It may also be of influence whether the contactless electrical or magnetic coupling of the second terminal of the test arrangement to the at least one reinforcing layer takes place from outside or else from inside—which admittedly will remain more the exception—the high-pressure hose.

It is with a quite particularly high benefit that implementations of the inventive method can be used in connection with such methods for producing high-pressure hydraulic lines in which, before the connecting fitting is set in place, the high-pressure hose is peeled at the end of its end portion on the inside and/or outside to expose at least partly the or at least one metallic reinforcing layer. The reason for peeling the high-pressure hose is to create favorable prerequisites for good testing reproducibility.

According to yet another preferred further development of the invention, the present invention is used in connection with such a method for producing high-pressure hydraulic lines using a nipple and a connecting fitting having a pressing sleeve in which
the connecting fitting is placed on the high-pressure hose by inserting the nipple into the high-pressure hose and inserting this into an annular gap between nipple and pressing sleeve, and
during the operation of joining the raw hydraulic line formed in this way, laying this in a radial press having a press die equipped with several press jaws while placing the pressing sleeve in the press die, and then pressing the pressing sleeve radially to reduce the inside width of the annular gap around the connecting fitting.

It is then particularly favorable when the quality of the connection of the connecting fitting with the high-pressure hose is determined in the radial press. It is quite particularly advantageous when the determination of the quality of the connection of the connecting fitting with the high-pressure hose in the radial press takes place before the end of radial pressing. The reason for this is that, in this case, the possibility exists that the test arrangement communicates with the control unit of the radial press in such a way that the radial pressing of the pressing sleeve, especially the end of radial pressing, is controlled as a function of a signal of the test arrangement. The quality monitoring already taking place in this way in the production process while it is still in progress, together with the possibility of methodically influencing the remaining course of the production process, is in turn particularly advantageous from viewpoints of efficiency, since rejects can be reduced hereby.

In the spirit of the further development of the inventive method explained in the foregoing, implementations of the present invention also encompass a radial press suitable for executing this method, comprising a press die having several press members disposed around a press axis and capable of moving radially relative to the press axis by means of a drive unit, and a test arrangement having two terminals, wherein a first of the terminals is set up for electrical and/or magnetic coupling to the connecting fitting and the second terminal is set up for contactless electrical and/or magnetic coupling to the reinforcing layer or at least one of the reinforcing layers of the high-pressure hose of the raw hydraulic line. In particular, these terminals of the test arrangement may be disposed on one of the press members of the press die. A correspondingly designed radial press, i.e. one suitable for executing implementations of the inventive method explained in detail in the foregoing, is nevertheless not restricted to just this method as regards its service capabilities. To the contrary, it can also be used, likewise with advantage, for the production, for example, of insulators, of CFK shafts and of other workpieces by joining respectively several component parts with one another by radial pressing.

To avoid misconceptions, however, it is to be emphasized that the in-process quality monitoring explained in the foregoing is by no means mandatory. To the contrary, it is likewise possible within the scope of the present invention for the hydraulic line to be removed from the radial press and only thereafter subjected to the quality test. In particular, in this spirit the hydraulic line can be removed from the radial press and mounted in a (separate) pressure test stand, wherein quality of the connection of the connecting fitting with the high-pressure hose is determined in the pressure test stand. This is correspondingly true for the determination of the quality of the connection of the connecting fitting with the high-pressure hose that takes place in combination with cleaning of the hydraulic line in a cleaning apparatus.

If, in the foregoing sense, the quality of the connection of the connecting fitting with the high-pressure hose is determined in a pressure test stand, preferably just that determination of the quality of the connection of the connecting fitting with the high-pressure hose is then carried out under different pressurization conditions by means of a test medium (air, gas, water, oil or the like). The reason is that possible deviations from one another of the response signals occurring under different pressure conditions likewise permit inferences about the condition of the high-pressure hydraulic line being tested.

BRIEF DESCRIPTION OF THE DRAWINGS

The present invention will be explained in more detail in the following on the basis of a preferred exemplary embodiment, illustrated schematically in the drawings, of a radial press designed and suitable for executing the method.

DETAILED DESCRIPTION OF THE PREFERRED EMBODIMENTS

Figure 1:
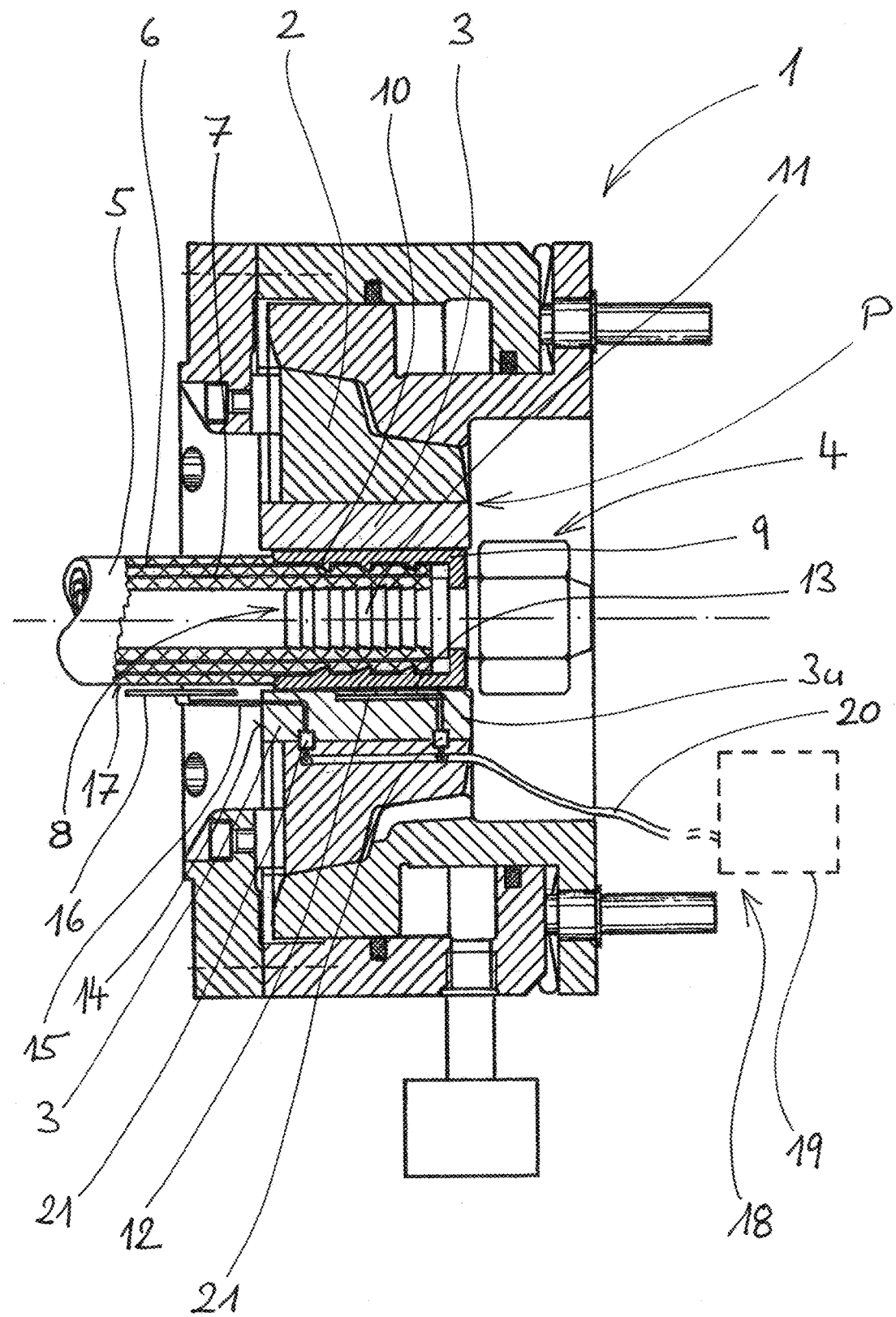
FIG. 1 illustrates an axial section through such a radial press.
Figure 2:
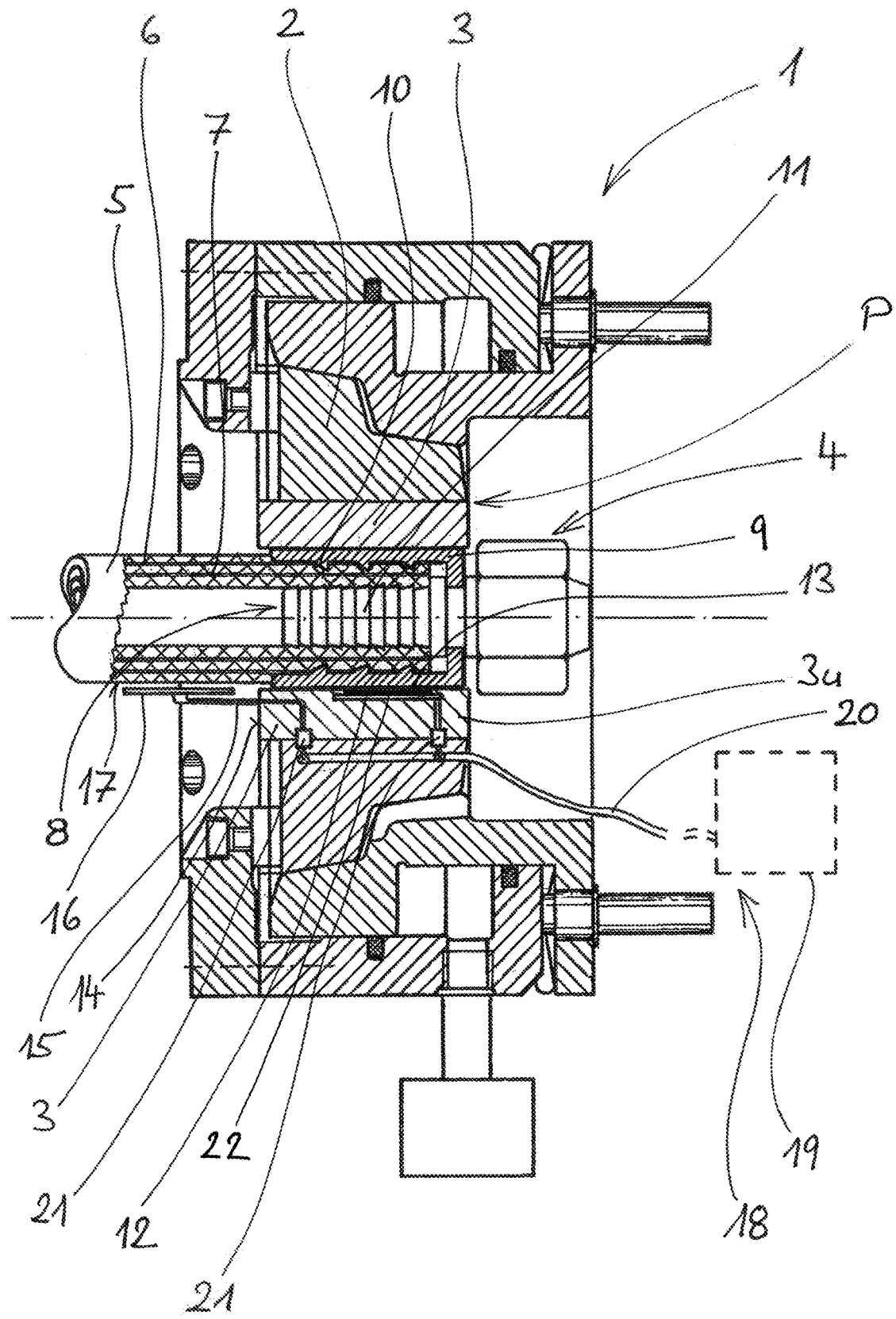
FIG. 2 illustrates an axial section through such a radial press.

FIGS. 1 and 2 illustrate axial sections through an embodiment of a radial press.

With the exception of the viewpoints and special features explained. hereinafter, radial press 1 according to the illustrated exemplary embodiment corresponds without restriction to that according to FIG. 1 of DE 28 44 475 A1. To avoid unnecessary repetitions, reference is therefore made specifically to DE 28 44 475 A1 as regards the design and construction, the technical details and the mode of operation of the radial press.

What is shown is radial press 1 with press-jaw attachments 3 mounted (interchangeably) on press jaws 2; respectively the entire combination of a press jaw 2 and a press-jaw attachment 3 mounted on it then forms a press member P. For the sake of clarity, the illustration of details of the connection of press-jaw attachments 3 with press jaws 2 has been omitted here. For this purpose, the press-jaw attachments may in the usual manner have bolts, for example, which snap into corresponding seats constructed on press jaws 2 (see also, for example, DE 201 09 212 U1).

Furthermore, in its use for pressing a connecting fitting 4, radial press 1 is shown at the end of a high-pressure hose 5. This high-pressure hose 5 has two reinforcing layers 6, 7, wherein outer reinforcing layer 6 consists in the usual way of a metal braid. Connecting fitting 4 comprises—in likewise conventional manner—a nipple 8 and a pressing sleeve 9. This has several annular clamping projections 10 on its inner circumference. The portion 11 of nipple 8 to be inserted into high-pressure hose 5 has in turn a surface profiled in the usual way. In its region to be inserted into connecting fitting 4, i.e. in the annular space situated between pressing sleeve 9 and portion 11 of nipple 8, high-pressure hose 5 is peeled on its outside, and specifically as far as the outer reinforcing layer 6.

All of this is conventional and best known to the person skilled in the art, and so further explanations are not needed.

As illustrated in FIG. 1 and on the basis of lower press-jaw attachment 3u, a first terminal 12 is embedded in (at least) one of the press-jaw attachments 3, and specifically close to pressing face 13—designed for bearing on pressing sleeve 9 of connecting fitting 4—of press-jaw attachment 3u in question. Thus, via a suitable electrical influence on first terminal 12, this can be coupled inductively to pressing sleeve 9. As illustrated in FIG. 2, in a modification of the embodiment shown, a contact sensor 22 is placed on the connecting fitting 4 to form a galvanic contact between the contact sensor 22 and the connecting fitting 4.

On its front side 14 facing high-pressure hose 5, a second terminal 16 is attached to lower press-jaw attachment 3u via a retainer 15, and specifically in such a way that it is opposite and close to surface 17 of high-pressure hose 5. Thus, via a suitable electrical influence on second terminal 16, this can be coupled inductively to outer reinforcing layer 6 of high-pressure hose 5.

First terminal 12 as well as second terminal 16 are then part of a test arrangement 18, which furthermore comprises a control module 19. These two terminals 12 and 16 are connected electrically with control module 19 via a line 20 as well as with two plug-type interfaces 21, which permit interchangeability of press-jaw attachments 3. Via this electrical connection, an electrical test signal is applied by the control module to first terminal 12 and/or second terminal 16, depending on the individual test program.

Depending on the individual test program, first terminal 12 and/or second terminal 16 acts subsequently as a transducer. The electrical response signal occurring during this use of at least one of terminals 12 and 16 as transducer in the test arrangement is subsequently compared with a target-value range—for the specific high-pressure-hose/connecting-fitting pair in question—saved in a memory of the test arrangement. If the actual response signal lies within the bandwidth of the target-value range, the pressing and thus the workpiece are deemed to be acceptable. Otherwise, depending on the severity and orientation of the deviation, either rework is carried out in the radial press (repressing) or else the workpiece is separated out as defective.

It is obvious that the explanation of the present invention on the basis of a radial press—equipped in the spirit of the invention—constructed according to DE 28 44 475 A1 is purely exemplary and that the invention can be implemented in comparable manner in radial presses operating according to different concepts (e.g. so-called "yoke presses", for example according to DE 20 2016 100 660 U1 and the further prior art cited therein).

What is claimed is:

1. A method for producing a high-pressure hydraulic line by attaching a connecting fitting (4) at the end of a multi-layer, high-pressure hose (5) having at least one reinforcing layer (6, 7), comprising:
   providing a portion of a reinforced high-pressure hose (5) as well as a connecting fitting (4) to be joined with this,
   placing the connecting fitting (4) on the end portion of the high-pressure hose (5), performing a joining operation to form a tight connection of the high-pressure hose (5) with the connecting fitting (4), the method further including a determination of the quality of the connection of the connecting fitting (4) with the high-pressure hose (5), comprising:

applying an electrical test signal to least one terminal (12; 16) of a test arrangement (18) having two terminals (12; 16), of which a first terminal (12) is coupled electrically and/or magnetically to the connecting fitting (4) and a second terminal (16) is coupled electrically and/or magnetically in contactless relationship to the reinforcing layer (6) or at least one of the reinforcing layers (6, 7) of the high-pressure hose (5), recording an electrical response signal occurring in the test arrangement, comparing the response signal with a target-value range saved in a memory of the test arrangement (18) for the high-pressure-hose/connecting-fitting pair in question.

2. The method of claim 1, wherein, for electrical coupling of the first terminal (12) of the test arrangement (18) to the connecting fitting (4), a contact sensor is placed on the connecting fitting (4) to form a galvanic contact between the contact sensor and the connecting fitting (4).

3. The method of claim 1, wherein the contactless electrical coupling of the second terminal (16) of the test arrangement (18) to the at least one reinforcing layer (6, 7) is situated adjacent to the connecting fitting (4), i.e. not further away from it than 3 times the diameter of the high-pressure hose (5).

4. The method of claim 3, wherein the contactless electrical coupling of the second terminal (16) of the test arrangement (18) to the at least one reinforcing layer (6, 7) is situated in close proximity to the connecting fitting (4).

5. The method of claim 1, wherein the second terminal (16) of the test arrangement (18) is coupled capacitively to the at least one reinforcing layer (6, 7).

6. The method of claim 1, wherein the second terminal (16) of the test arrangement (18) is coupled inductively to the at least one reinforcing layer (6, 7).

7. The method of claim 1, wherein, before the connecting fitting (4) is set in place, the high-pressure hose (5) is peeled at the end of its end portion on the inside and/or outside to expose at least partly the or at least one metallic reinforcing layer (6, 7).

8. The method of claim 1, wherein, during use of a nipple (8) and a connecting fitting (4) having a pressing sleeve (9), the connecting fitting (4) is placed on the high-pressure hose (5) by inserting the nipple (8) into the high-pressure hose (5) and inserting this into an annular gap between nipple (8) and pressing sleeve (9), and, during the operation of joining the raw hydraulic line formed in this way, laying this in a radial press (1) having a press die equipped with several press members (P) while placing the pressing sleeve (9) in the press die, and then pressing the pressing sleeve (9) radially to reduce the inside width of the annular gap around the connecting fitting (4).

9. The method of claim 8, wherein the quality of the connection of the connecting fitting (4) with the high-pressure hose (5) is determined in the radial press (1).

10. The method of claim 9, wherein the determination of the quality of the connection of the connecting fitting (4) with the high-pressure hose (5) in the radial press (1) is used before the end of radial pressing.

11. The method of claim 10, wherein the test arrangement (18) communicates with a control unit of the radial press (1) in such a way that the radial pressing of the pressing sleeve (9), especially the end of radial pressing, is controlled as a function of a signal of the test arrangement (18).

12. The method of claim 9, wherein the determination of the quality of the connection of the connecting fitting (4) with the high-pressure hose (5) takes place under different pressurization conditions by means of a test medium.

13. A radial press for executing the method of claim 3 comprising a press die having several press members (P) disposed around a press axis and capable of moving radially relative to the press axis by means of a drive unit, and a test arrangement (18) having two terminals (12, 16), wherein a first (12) of the terminals (12, 16) is set up for electrical and/or magnetic coupling to the connecting fitting (4) and the second terminal (16) is set up for contactless electrical and/or magnetic coupling to the reinforcing layer (6) or at least one of the reinforcing layers (6, 7) of the raw hydraulic line.

14. The radial press of claim 13, wherein the terminals (12, 16) of the test arrangement (18) are disposed on one of the press members (P) of the press die.

* * * * *